United States Patent
Rastogi et al.

(10) Patent No.: US 7,613,347 B1
(45) Date of Patent: Nov. 3, 2009

(54) LOW-COMPLEXITY IMAGE CODING

(75) Inventors: Anubha Rastogi, Delhi (IN); Balaji Krishnamurthy, Delhi (IN)

(73) Assignee: Adobe Systems, Incorporated, San Jose, CA (US)

( * ) Notice: Subject to any disclaimer, the term of this patent is extended or adjusted under 35 U.S.C. 154(b) by 724 days.

(21) Appl. No.: 11/303,076

(22) Filed: Dec. 13, 2005

(51) Int. Cl.
*G06K 9/36* (2006.01)
(52) U.S. Cl. ..................................................... 382/232
(58) Field of Classification Search .................. None
See application file for complete search history.

(56) References Cited

U.S. PATENT DOCUMENTS

| | | | | |
|---|---|---|---|---|
| 5,537,493 | A * | 7/1996 | Wilkinson | 382/240 |
| 5,754,793 | A | 5/1998 | Eom et al. | |
| 5,815,097 | A | 9/1998 | Schwartz et al. | |
| 5,867,602 | A | 2/1999 | Zandi et al. | |
| 6,658,159 | B1 | 12/2003 | Taubman | |
| 2002/0015443 | A1 * | 2/2002 | Felts et al. | 375/240 |
| 2004/0141652 | A1 * | 7/2004 | Fukuhara et al. | 382/232 |

OTHER PUBLICATIONS

Subhasis Saha and Rao Vemuri, "Adaptive wavelet coding of multimedia images", Proceedings of the seventh ACM international conference on multimedia (part 2) multimedia '99, Oct. 1999, Publisher: ACM Press.

* cited by examiner

*Primary Examiner*—Matthew C Bella
*Assistant Examiner*—Alex Liew
(74) *Attorney, Agent, or Firm*—Robert C. Kowert; Meyertons, Hood, Kivlin, Kowert & Goetzel, P.C.

(57) ABSTRACT

A system that compresses a digital image. During operation, the system performs a transform operation on a digital image to produce transform domain coefficients, and then quantizes the transform domain coefficients to produce quantized coefficients. The system then separates the low entropy portions of the quantized coefficients from the high entropy portions of the quantized coefficients, wherein the low entropy portions of the quantized coefficients comprise the most-significant bitplanes of the quantized coefficients. Next, the system compresses the low entropy portions of the quantized coefficients while not substantially compressing the high entropy portions of the quantized coefficients.

26 Claims, 4 Drawing Sheets

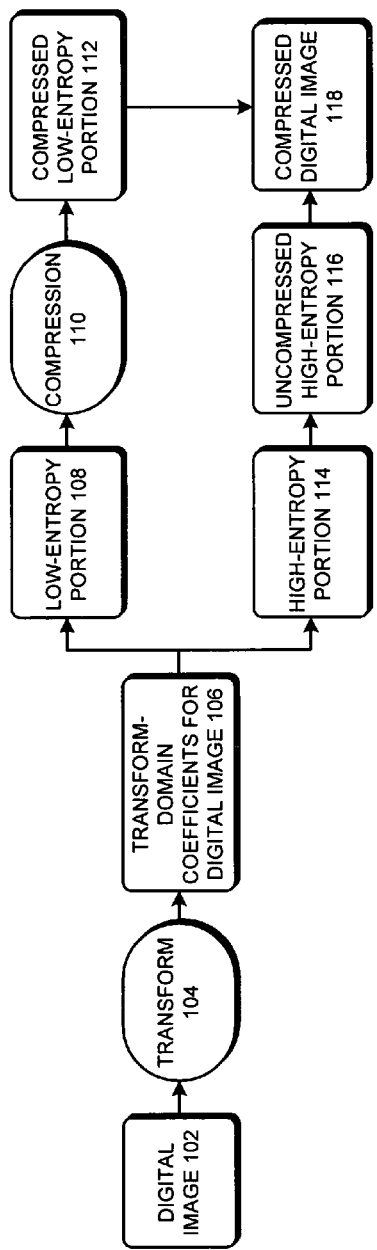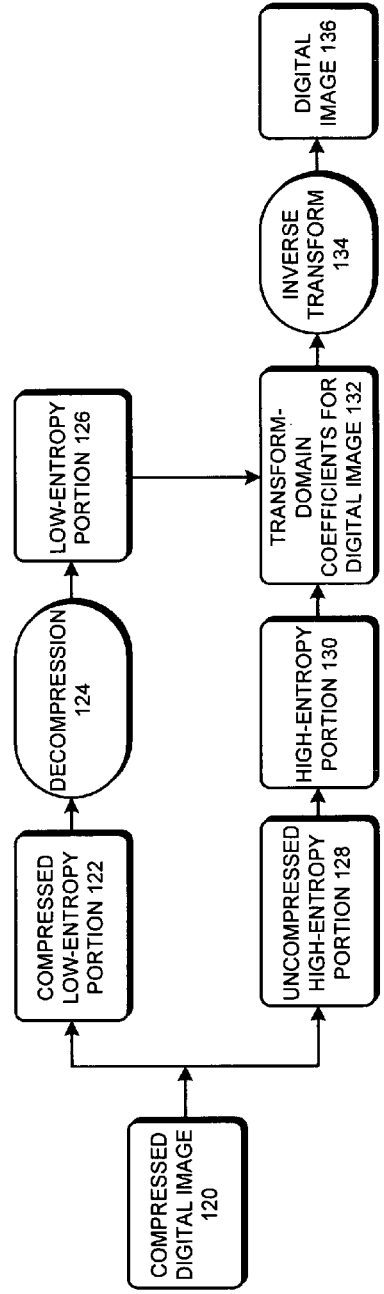
FIG. 1A
FIG. 1B

```
1 0 0 1                          0 0 0 0
1 1 0 1                          0 0 0 0
0 0 0 0                          0 0 0 0
0 1 0 0                          0 0 0 0
---------                        ---------
1 1 0 1 = 13                     0 0 0 0 = 0

Huff(13) 1100 0101 1100          Huff(0)

1 1 1 1                          1 0 1 0
1 1 1 1                          0 1 0 1
1 1 1 1                          0 0 0 0
1 1 1 1                          0 0 0 0
---------                        ---------
1 1 1 1 = 15                     1 1 1 1 = 15

Huff(15) 1111 1111 1111 1111     Huff(15) 1000 0100 1000 0100
```

LOW-COMPLEXITY IMAGE CODING

BACKGROUND

1. Field of the Invention

The present invention relates to techniques for compressing digital images. More specifically, the present invention relates to a method and apparatus for compressing a digital image, which operates by transforming a digital image into coefficients and then compressing the low-entropy portions of the coefficients while not substantially compressing the high-entropy portions of the coefficients.

2. Related Art

In recent years, the use of high-resolution digital cameras has increased significantly. Unfortunately, storing the high-resolution digital images produced by such cameras requires large amounts of memory. For example, a 4 mega-pixel digital camera requires up to 12 mega-bytes (MB) of memory to store a single raw, uncompressed digital image. Furthermore, transmitting a large digital image across a network requires a substantial amount of time, even when a high-speed broadband Internet connection is used. In order to deal with these problems, image-compression techniques are typically used to reduce the size of a digital image.

In commonly-used transform-based compression techniques, a digital image is transformed, for example, by using a discrete cosine transform (DCT) or a wavelet transform, to convert pixel values in the digital image into transform-domain coefficients. Next, the transform-domain coefficients are quantized by dividing the transform-domain coefficients by a quantizer and rounding the result to the nearest integer. These quantized transform-domain coefficients are then "entropy coded." Note that it is the entropy coding that actually compresses the data. The purpose of the transform and the quantization operations is to make the image data more amenable to compression by removing redundancies and by presenting a low-entropy data stream to the entropy coder. Some examples of transform-based image coding techniques are JPEG, which uses a DCT, and JPEG2000, which uses a wavelet transform.

A corresponding decoder performs the inverse operations in reverse order to recover the image. For example, the decoding process can involve entropy decoding, followed by de-quantization and an inverse transform.

In order to produce the best possible compression, modern wavelet-based compression systems use arithmetic coders for entropy coding. An arithmetic coder is an entropy coder that can compress data close to the theoretical maximum that can be achieved (i.e. the length of an arithmetically-coded stream will be close to the entropy of the stream). Since the success of arithmetic-coding depends on the availability of a good probabilistic model of the coefficient bit patterns, highly sophisticated bit-modeling techniques have been developed. One example of a coefficient bit-modeling/arithmetic-coding scheme is EBCOT (Embedded Block Coding with Optimized Truncation), which is incorporated into the JPEG2000 image coding standard.

Although bit-modeling/arithmetic-coding schemes provide good compression, they tend to be slow, even on modern processors. The majority of the time spent decompressing/compressing an image is spent on the coding of the wavelet coefficients. For example, up to 70% of the time taken to decompress a JPEG2000 stream is spent in entropy coding. This large amount of computational time is a substantial obstacle in the deployment of wavelet-based compression techniques for many image-processing applications, the most notable being video applications.

One solution to this problem is to bypass the arithmetic coder. The JPEG2000 standard provides an arithmetic bypass mode, in which the arithmetic coder is bypassed for some of the sub-bitplane passes. Unfortunately, this technique is still extremely complex because: (1) there is at least one pass in each plane that is arithmetically coded, and (2) the bit modeling is performed for all passes regardless of whether the arithmetic coder is to be employed or not.

Another solution is to use the existing JPEG compression standard, which uses DCT and Huffman coding, and has low complexity. Unfortunately, JPEG compression cannot achieve compression comparable to wavelet-based systems. For example, a typical JPEG2000 image is about 30% smaller than a JPEG image of comparable quality. Furthermore, at low quality the blocking artifacts of JPEG are very significant. Note that the entropy coder used for JPEG compression does not attempt to separate the low-entropy and high-entropy portions of the quantized DCT coefficients.

Hence, what is needed is a method and an apparatus for compressing a digital image without the problems described above.

SUMMARY

One embodiment of the present invention provides a system that compresses a digital image. During operation, the system performs a transform operation on the digital image to produce transform domain coefficients, and then quantizes the transform domain coefficients to produce quantized coefficients. The system then separates the low-entropy portions of the quantized coefficients from the high-entropy portions of the quantized coefficients, wherein the low-entropy portions of the quantized coefficients comprise the most-significant bitplanes of the absolute values of the quantized coefficients. Next, the system compresses the low-entropy portions of the quantized coefficients while not substantially compressing the high-entropy portions of the quantized coefficients.

In a variation on this embodiment, while performing the transform operation on the digital image to produce transform domain coefficients, the system performs a discrete cosine transform or a wavelet transform.

In a variation on this embodiment, while compressing the low-entropy portions of the quantized coefficients, the system partitions the quantized coefficients into smaller blocks of coefficients. If the maximum number of bitplanes for the absolute values of the smaller block of coefficients is greater than zero, the system: (1) partitions the smaller blocks of coefficients into sub-blocks of coefficients; (2) generates a bit pattern for a given low-entropy bitplane within a given sub-block by using a one to represent each column of the given low entropy bitplane which contains ones, and by using a zero to represent each column of the given low-entropy bitplane which does not contain ones; (3) encodes the bit pattern for the given low-entropy bitplane within the given sub-block; and (4) for each column of the given low-entropy bitplane within the given sub-block which contains ones, appends the column of bits to the encoded bit pattern for the given sub-block.

In a further variation on this embodiment, if the maximum number of bitplanes for the smaller block of coefficients is zero, the system encodes the smaller block of coefficients with a zero.

In a further variation on this embodiment, if the sub-block of coefficients is a corner sub-block, which is not a standard sub-block size, the system generates a bit pattern for the given low-entropy bitplane within the corner sub-block by doing the following: (1) for each column of the given low-entropy bitplane within the corner sub-block which contains a one, using a one to represent the column, and appending the column of bits to the bit pattern for the given low-entropy bitplane within the corner sub-block; and (2) for each column of the given low-entropy bitplane within the corner sub-block which contains a zero, using a zero to represent the column.

In a further variation on this embodiment, the standard sub-block size is n bits by n bits.

In a variation on this embodiment, while encoding the bit pattern for the given low entropy bitplane, the system uses a Huffman coding technique.

In a further variation on this embodiment, the Huffman table used with the Huffman coding technique is either a static table, or a custom-generated table saved with each image.

In a variation on this embodiment, the method is used to compress a sequence of images or to compress motion-compensated difference frames.

In a variation on this embodiment, sign information for the quantized coefficients is not compressed.

In a variation on this embodiment, the high-entropy portions of the quantized coefficients are not compressed, and are directly written to an output bitstream.

BRIEF DESCRIPTION OF THE FIGURES

FIG. 1A presents a block diagram illustrating the process of compressing a digital image in accordance with an embodiment of the present invention.

FIG. 1B presents a block diagram illustrating the process of decompressing a compressed digital image in accordance with an embodiment of the present invention.

FIG. 2A illustrates several bit patterns and corresponding codes in accordance with an embodiment of the present invention.

FIG. 2B illustrates several bit patterns and corresponding codes for corner sub-blocks in accordance with an embodiment of the present invention.

DETAILED DESCRIPTION

Figure 3:
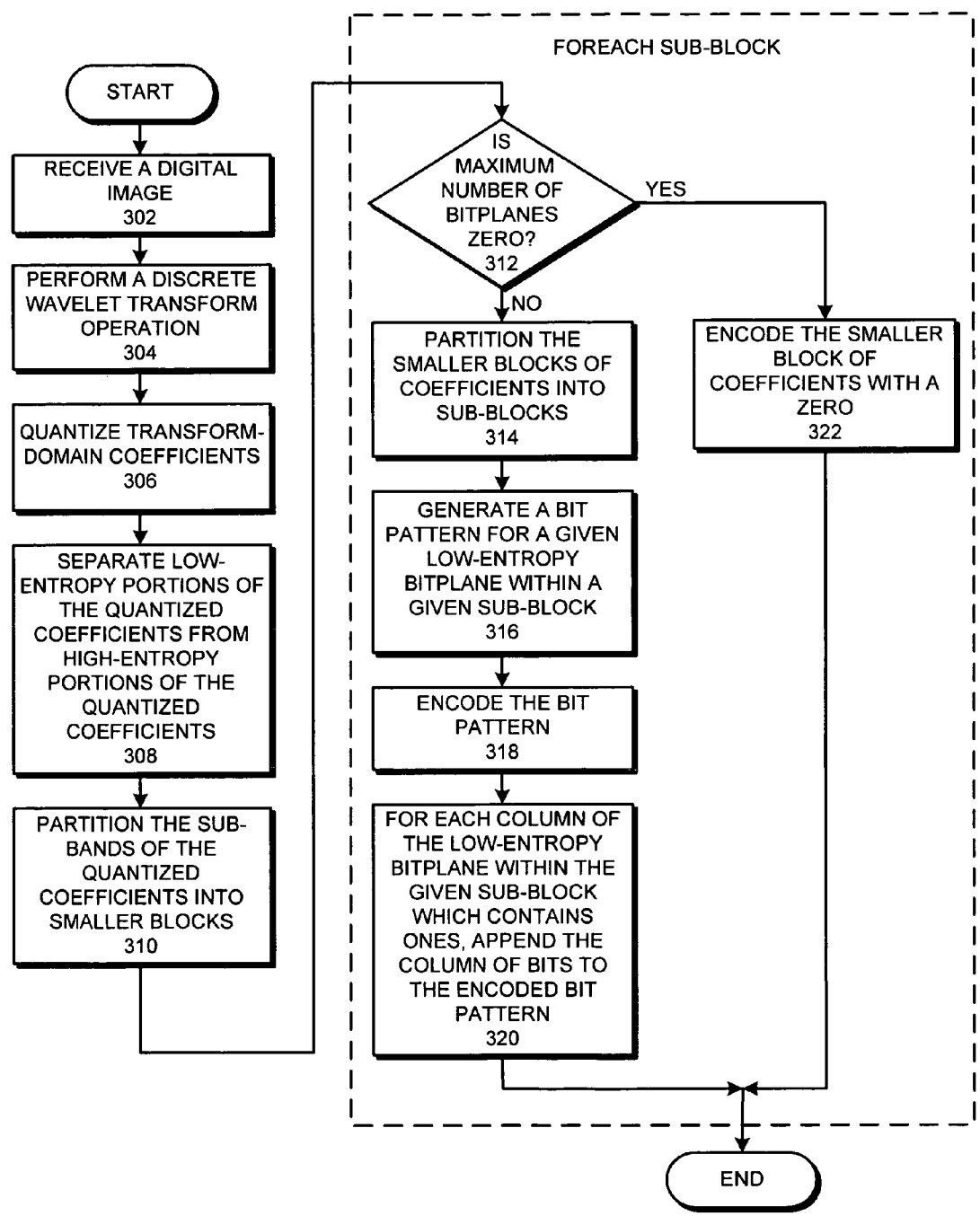
FIG. 3 presents a flow chart illustrating the process of compressing a sub-block in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

OVERVIEW

Many applications can sacrifice some compression in exchange for increased decompression performance. One such example is an application that handles high-quality video. Note that even applications that need to handle single images will benefit from a fast decompression if they have to handle large number of images at a time (for example, a slideshow).

Up to 70% of the time in the state of the art compression systems, such as JPEG2000, is spent in entropy coding. Therefore, it is desirable to replace the bit-modeling/arithmetic-coding technique specified in the JPEG2000 standard with a lower-complexity technique which can compress images to sizes comparable to the ones achieved by JPEG2000, but which are substantially faster.

In one embodiment of the present invention, the "compressible" (low-entropy) portion and the "incompressible" (high-entropy) portions of the quantized wavelet transform coefficients are separated. A simple compression technique is applied to the compressible portions of the quantized wavelet transform coefficients and the incompressible portions of the quantized wavelet transform coefficients are not compressed.

FIG. 1A presents a block diagram illustrating the process of compressing a digital image in accordance with an embodiment of the present invention. Transform 104 transforms digital image 102 to produce transform-domain coefficients 106. Transform-domain coefficients 106 include low-entropy portion 108 and high-entropy portion 114. Compression module 110 operates on low-entropy portion 108 to produce compressed low-entropy portion 112. High-entropy portion 114 remains uncompressed (i.e. uncompressed high-entropy portion 116).

FIG. 1B presents a block diagram illustrating the process of decompressing a compressed digital image in accordance with an embodiment of the present invention. Decompression module 124 decompresses compressed low-entropy portion 122 of compressed digital image 120 to produce low-entropy portion 126. Since uncompressed high-entropy portion 128 of compressed digital image 120 is not compressed, uncompressed high-entropy portion 128 is the same as high-entropy portion 130. Inverse transform module 134 performs an inverse transform on transform-domain coefficients 132 (which includes low-entropy portion 126 and high-entropy portion 130) to produce digital image 136.

Note that following the wavelet transform and quantization processes, blocks of nearby coefficients within each sub-band have nearly the same length in bits. Moreover, only a few most significant bitplanes of each block are compressible (i.e. have low-entropy).

One embodiment of the present invention uses a low-complexity Huffman coder to code the low-entropy portions of the bitplanes, and the high-entropy portions (i.e. the lower significant bitplanes) are written out without any compression.

In one embodiment of the present invention, the low-entropy portions of the bitplanes are the top n bitplanes.

Note that one embodiment of the present invention does not employ bit-modeling or arithmetic-coding.

Coding Coefficient Lengths

A wavelet transform process transforms the spatial-domain representation of the digital image into a frequency-domain representation. This wavelet transform process generates coefficients which are grouped into sub-bands. Each sub-band is divided into small sub-blocks and the significant bitplanes of the sub-block are encoded. Note that the maximum number of significant bitplanes of a sub-block is the length (in bits) of the sub-block coefficient that has the largest absolute value. Also, note that the size of the sub-block is chosen to be small because a small group of coefficients next to each other has a greater chance of having the same length. A sub-block which is too small causes excessive overhead while coding the number of significant planes of the sub-blocks. (Furthermore, note that although this specification describes a system that applies the present invention to a wavelet-based compression technique, the present invention can be applied to other compression techniques, and is not meant to be limited to wavelet-base techniques.)

In one embodiment of the present invention, the standard block size is n coefficients by n coefficients.

In one embodiment of the present invention, to minimize the number of bits used to encode the number of significant bitplanes for each block, the minimum number of significant bitplanes for a block of a sub-band is determined, and for each block, the difference between the number of bitplanes in a given block and the minimum number of bitplanes is used to encode the number of significant planes for each block.

Bitplane Coding

In one embodiment of the present invention, the top two bit-planes of each sub-block are mostly zeros and hence can be compressed. Each bitplane is compressed independently. The present invention uses Huffman coding for compression. The symbols for Huffman coding are created by aggregating the values of individual bits of the sub-block in the following way.

A four-bit symbol is produced for a four-by-four block of pixels within the sub-block. The four-bit symbol indicates which columns are zero and which columns contain at least a one (i.e. non-zero). For each column of four-by-one pixels, a zero is used to represent the column if all bits in the column are zero. A one is used to represent the column if at least one bit in the column is one (i.e. non-zero). Hence, a four-bit symbol for the four-by-four sub-block (one for each column) is generated, which indicates which columns are all zero and which columns contain at least a one bit.

FIG. 2A illustrates several bit patterns and the corresponding codes in accordance with an embodiment of the present invention. Note that Huff(x) is the Huffman code for symbol x. For example, Huff(13) is the Huffman code for symbol 1101 (i.e. decimal 13).

A Huffman code is generated for the symbols (decimals 0 to 15). The Huffman tree can be statically created, based on experimental data, or it can be fine-tuned for a particular image. The encoding of each four-by-four block includes the Huffman code for the block followed by the bit pattern of each column which contains at least one non-zero bit. If all the bits of a particular column are zero, nothing is signaled since it can be inferred from the Huffman code that all entries in the column are zero.

For example, in FIG. 2A, the bit pattern Huff(13) 1100 0101 1100 is the Huffman code for the symbol 13 (binary 1101) followed by each column with at least a one (i.e. 1100, 0101, 1100).

For corner sub-blocks (i.e. blocks that are not four-by-four in size), a zero is used to represent the column if all the bits in the column are zero. A one bit followed by the column of bits is used to represent a column containing at least a one. FIG. 2B illustrates several bit patterns and the corresponding codes for corner sub-blocks in accordance with an embodiment of the present invention.

FIG. 3 presents a flow chart illustrating the process of compressing a sub-block in accordance with an embodiment of the present invention. The process begins when the system receives a digital image (step 302). Next, the system performs a discrete wavelet transform operation on the digital image to produce transform-domain coefficients (step 304) and quantizes the transform-domain coefficients (step 306). The system then separates the low-entropy portions of the quantized coefficients from the high-entropy portions of the quantized coefficients (step 308).

Next, the system partitions the sub-bands of the quantized coefficients into smaller blocks of coefficients (step 310).

The system performs steps 312 to 322 on each sub-block. If the maximum number of bitplanes for the smaller block of coefficients is zero, the system encodes the smaller block of coefficients with a zero (steps 312 and 322).

If the maximum number of bitplanes for the smaller block of coefficients is greater than zero, the system partitions the smaller block of coefficients into sub-blocks (steps 312 and 314). The system then generates a bit pattern for a given low-entropy bitplane within a given sub-block by using a one to represent each column of the given low-entropy bitplane which contains ones, and using a zero to represent each column of the given low-entropy bitplane which does not contain ones (step 316).

Next, the system encodes the bit pattern for the given low-entropy bitplane within the given sub-block (step 318). For each column of the given low-entropy bitplane within the given sub-block which contains ones, the system appends the column of bits to the encoded bit pattern for the given sub-block (step 320).

Beyond the top two bitplanes, there is very little to compress. Hence, the remaining bitplanes are written out with no compression.

For systems that require even less complexity, this bitplane coding step can be bypassed and the coefficients can be written out as it is, without any compression.

In one embodiment of the present invention, the sign information of the non-zero coefficients in the block is collected and is written directly without any compression. If greater compression of the sign information is desired, then the sign information is signaled at the end of each coefficient such that the sign information is sent only if the coefficient is non-zero.

Note that if the coefficients are written bitplane-by-bitplane instead of all at once, an embedded code stream organization is achieved, thereby enabling progressive transmission. A post-compression rate-distortion (PCRD) process can be performed on the sub-blocks to produce an optimally scalable and embedded code stream. In this case, the sign plane needs to be written for each coefficient at the beginning, whether the coefficient is zero or not. This will cause a minor increase in file sizes.

One embodiment of the present invention uses two-by-two blocks to generate symbols for Huffman coding. Another embodiment of the present invention uses one-by-four (horizontal) blocks to generate symbols for Huffman coding. The compression efficiency for these embodiment is similar to the four-by-one blocks case described in detail here, but the advantage of four-by-one blocks (vertical lines) is that it is amenable to optimization (for example, SIMD instruction optimization).

In one embodiment of the present invention, the compression technique can be applied to individual images or to a sequence of images. For a sequence of images, such as a video stream, the technique can be applied to individual video frames or to the motion-compensated difference frames. If the compression technique is applied to each frame separately, the resulting stream is easily editable.

Decompressing a Compressed Digital Image

Figure 4:
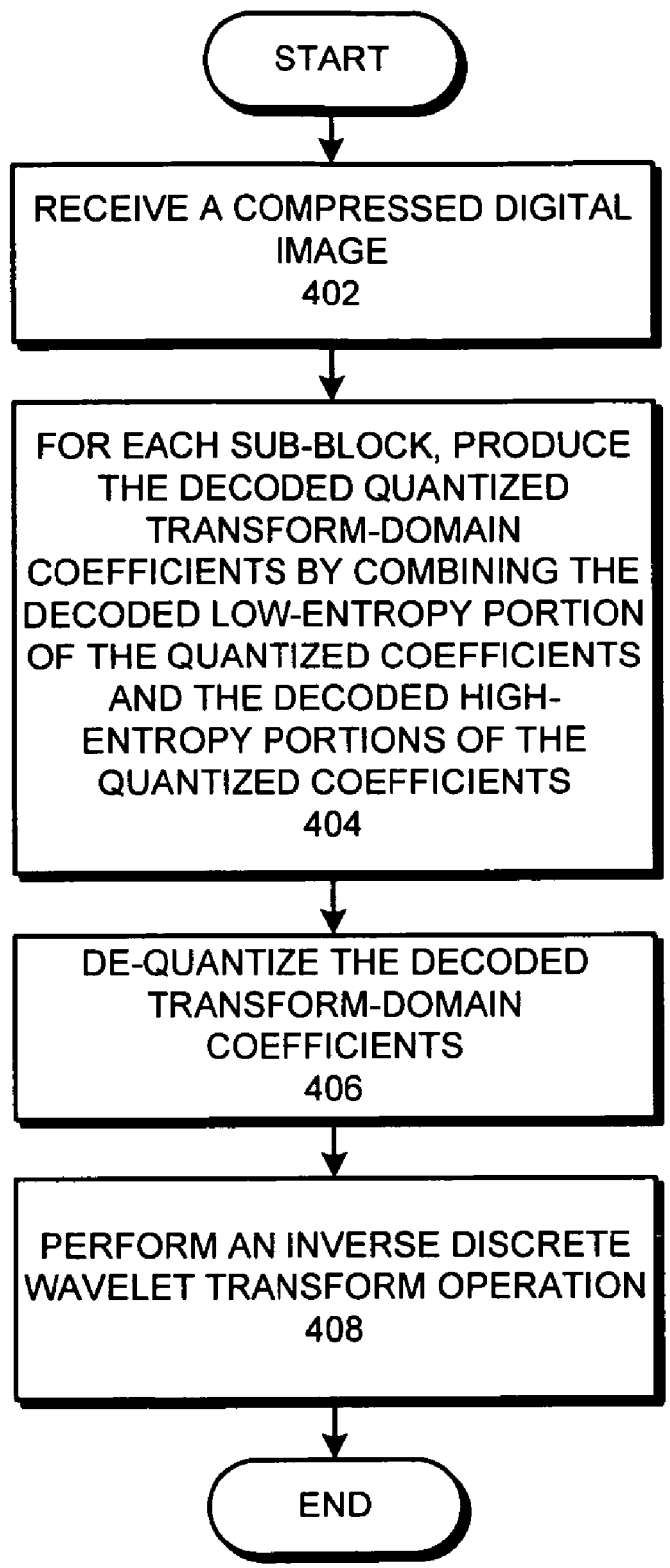
FIG. 4 presents a flow chart illustrating the process of decompressing a compressed digital image in accordance with an embodiment of the present invention.

FIG. 4 presents a flow chart illustrating the process of decompressing a compressed digital image in accordance with an embodiment of the present invention. The process begins when the system receives a compressed digital image (step 402).

Next, for each sub-block in the compressed digital image, the system produces the decoded quantized transform-domain coefficients by combining the decoded low-entropy portion of the quantized transfer-domain coefficients and decoded high-entropy portions of the quantized transfer-domain coefficients (step 404). The system decodes a given low-entropy bitplane within the sub-block by decoding the Huffman code for the given bitplane within the sub-block to produce the bit pattern which indicates whether a given column within the given bitplane contains ones. The system then generates an uncompressed bitplane within the sub-block for the given bitplane by inserting the corresponding bit pattern for each column into the uncompressed bitplane within the sub-block. Note that the corresponding bit pattern for each column follows the Huffman code for the given bitplane within the sub-block. If a column contains all zeros (indicated by a zero in the bit pattern), a column of zeros is inserted to the given uncompressed bitplane within the sub-block. If the Huffman code for the sub-block is a zero, the sub-block contains all zeros.

The system then de-quantizes the decoded transform-domain coefficients (step 406) and performs an inverse discrete wavelet transform operation on the decoded quantized transform-domain coefficients to produce the uncompressed digital image (step 408).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   using a computer to perform:
      receiving a digital image;
      performing a wavelet transform operation on the digital image to produce transform-domain coefficients;
      quantizing the transform-domain coefficients to produce quantized coefficients; and
      compressing one or more, but less than all, bitplanes of the quantized coefficients using a non-arithmetic encoding, wherein the one or more bitplanes that are compressed have a more significant bitplane position and less entropy than one or more bitplanes of the quantized coefficients that are not compressed.

2. The method of claim 1, wherein said compressing comprises:
   partitioning the quantized coefficients into two or more smaller blocks of coefficients;
   for each smaller block of coefficients, determining whether the respective smaller block comprises a maximum number of bitplanes greater than zero;
   in response to determining that the maximum number of bitplanes is greater than zero for a respective smaller block of coefficients:
      for a given low-entropy bitplane:
         partitioning the respective smaller block of coefficients into two or more sub-blocks of coefficients;
         generating a bit pattern for the given low-entropy bitplane within a given sub-block by using a one to represent each column of the given low-entropy bitplane which contains ones, and using a zero to represent each column of the given low-entropy bitplane which does not contain ones;
         encoding the bit pattern for the given low-entropy bitplane within the given sub-block, and
         for each column of the given low-entropy bitplane within the given sub-block which contains ones, appending the column of bits to the encoded bit pattern for the given sub-block; and
      for a given high-entropy bitplane:
         appending a portion of the smaller block of coefficients corresponding to the given high entropy bitplane to a bitstream for the digital image without any compression.

3. The method of claim 2, wherein if the maximum number of bitplanes for the smaller block of coefficients is zero, the method further comprises encoding the smaller block of coefficients with a zero.

4. The method of claim 2, wherein if the sub-block of coefficients is a corner sub-block, which is not a standard sub-block size, the method further comprises generating a bit pattern for the given low-entropy bitplane within the corner sub-block by:
   for each column of the given low-entropy bitplane within the corner sub-block which contains a one, using a one to represent the column, and appending the column of bits to the bit pattern for the given low-entropy bitplane within the corner sub-block; and
   for each column of the given low-entropy bitplane within the corner sub-block which contains a zero, using a zero to represent the column.

5. The method of claim 4, wherein the standard block size is n coefficients by n coefficients.

6. The method of claim 1, wherein encoding the bit pattern for the given low-entropy bitplane involves using a Huffman coding technique.

7. The method of claim 6, wherein the Huffman table used by the Huffman coding technique is a static table, or a custom-generated table saved with each image.

8. The method of claim 1, wherein the method is used to compress a sequence of images or to compress motion-compensated difference frames.

9. The method of claim 1, wherein the quantized coefficients include sign information and wherein the sign information of the quantized coefficients is not compressed.

10. The method of claim 1, wherein the quantized coefficients include sign information, and wherein the sign information of the quantized coefficients is coded by signaling the sign bit only for non-zero coefficients.

11. The method of claim 1, wherein the high-entropy portions of the quantized coefficients are not compressed, and are directly written to an output bitstream.

12. A computer-readable storage medium storing instructions that when executed by a computer cause the computer to perform a method for compressing a digital image, the method comprising:
   receiving the digital image;
   performing a wavelet transform operation on the digital image to produce transform-domain coefficients;
   quantizing the transform-domain coefficients to produce quantized coefficients; and
   compressing one or more, but less than all, bitplanes of the quantized coefficients using a non-arithmetic encoding, wherein the one or more bitplanes that are compressed have a more significant bitplane position and less entropy than one or more bitplanes of the quantized coefficients that are not compressed.

13. The computer-readable storage medium of claim 12, wherein said compressing comprises:
   partitioning the quantized coefficients into two or more smaller blocks of coefficients;
   for each smaller block of coefficients determining whether the respective smaller block comprises a maximum number of bitplanes greater than zero;
   in response to determining that the maximum number of bitplanes is greater than zero for a respective smaller block of coefficients:
      for a given low-entropy bitplane:
         partitioning the respective smaller block of coefficients into two or more sub-blocks of coefficients;
         generating a bit pattern for the given low-entropy bitplane within a given sub-block by using a one to represent each column of the given low-entropy bitplane which contains ones, and using a zero to represent each column of the given low-entropy bitplane which does not contain ones;
         encoding the bit pattern for the given low-entropy bitplane within the given sub-block, and
         for each column of the given low-entropy bitplane within the given sub-block which contains ones, appending the column of bits to the encoded bit pattern for the given sub-block; and
      for a given high-entropy bitplane:
         appending a portion of the smaller block of coefficients corresponding to the given high entropy bitplane to a bitstream for the digital image without any compression.

14. The computer-readable storage medium of claim 13, wherein if the maximum number of bitplanes for the smaller block of coefficients is zero, the method further comprises encoding the smaller block of coefficients with a zero.

15. The computer-readable storage medium of claim 13, wherein if the sub-block of coefficients is a corner sub-block, which is not a standard sub-block size, the method further comprises generating a bit pattern for the given low-entropy bitplane within the corner sub-block by:
   for each column of the given low-entropy bitplane within the corner sub-block which contains a one, using a one to represent the column, and appending the column of bits to the bit pattern for the given low-entropy bitplane within the corner sub-block; and
   for each column of the given low-entropy bitplane within the corner sub-block which contains a zero, using a zero to represent the column.

16. The computer-readable storage medium of claim 15, wherein the standard block size is n coefficients by n coefficients.

17. The computer-readable storage medium of claim 12, wherein encoding the bit pattern for the given low-entropy bitplane involves using a Huffman coding technique.

18. The computer-readable storage medium of claim 17, wherein the Huffman table used by the Huffman coding technique is a static table, or a custom-generated table saved with each image.

19. The computer-readable storage medium of claim 12, wherein the method is used to compress a sequence of images or to compress motion-compensated difference frames.

20. The computer-readable storage medium of claim 12, wherein the quantized coefficients include sign information, and wherein the sign information of the quantized coefficients is not compressed.

21. The computer-readable storage medium of claim 12, wherein the quantized coefficients include sign information, and wherein the sign information of the quantized coefficients is coded by signaling the sign bit only for non-zero coefficients.

22. The computer-readable storage medium of claim 12, wherein the high-entropy portions of the quantized coefficients are not compressed, and are directly written to an output bitstream.

23. An apparatus that compresses a digital image, comprising:
   a receiving mechanism configured to receive the digital image;
   a transform mechanism configured to perform a wavelet transform operation on the digital image to produce transform-domain coefficients;
   a quantizing mechanism configured to quantize the transform-domain coefficients to produce quantized coefficients; and
   a compression mechanism configured to compress one or more, but less than all, bitplanes of the quantized coefficients using a non-arithmetic encoding, wherein the one or more bitplanes that are compressed have a more significant bitplane position and less entropy than one or more bitplanes of the quantized coefficients that are not compressed.

24. A method for decompressing a compressed digital image, comprising:
   using a computer to perform:
      receiving the compressed digital image which contains compressed quantized transform-domain coefficients;
      decompressing one or more compressed bitplanes of the quantized coefficients using a non-arithmetic decoding, wherein not all bitplanes are compressed, and wherein the one or more bitplanes that are compressed have a more significant bitplane position and less entropy than one or more bitplanes of the quantized coefficients that are not compressed;
      de-quantizing the decompressed quantized transform-domain coefficients to produce transform-domain coefficients; and
      performing an inverse wavelet transform operation on the transform-domain coefficients to reproduce the decompressed digital image.

25. The method of claim 24, wherein for a given low-entropy bitplane within a given sub-block, decompressing the low-entropy portions of the compressed quantized transform-domain coefficients involves:
   decoding the Huffman code for the given bitplane within the given sub-block to produce a bit pattern which indicates whether a given column within the given bitplane contains ones, wherein a one in the bit pattern indicates that the corresponding column for the bit contains ones, and wherein a zero in the bit pattern indicates that the corresponding column for the bit contains all zeros; and
   generating the given uncompressed bitplane within the given sub-block by inserting the corresponding bit pattern for each column into the given uncompressed bitplane within the given sub-block, wherein the corresponding bit pattern for each column follows the Huffman code for the given bitplane within the given sub-block.

26. The method of claim 25, wherein if the Huffman code for the sub-block is zero, the sub-block contains all zeros.

* * * * *

UNITED STATES PATENT AND TRADEMARK OFFICE
CERTIFICATE OF CORRECTION

PATENT NO.       : 7,613,347 B1                                    Page 1 of 1
APPLICATION NO. : 11/303076
DATED            : November 3, 2009
INVENTOR(S)      : Rastogi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Nineteenth Day of October, 2010

David J. Kappos
*Director of the United States Patent and Trademark Office*